United States Patent
Shimada et al.

(10) Patent No.: US 9,947,948 B2
(45) Date of Patent: Apr. 17, 2018

(54) FUEL CELL SYSTEM

(71) Applicant: NISSAN MOTOR CO., LTD., Yokohama-shi, Kanagawa (JP)

(72) Inventors: Kazuhide Shimada, Yokohama (JP); Hayato Chikugo, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/403,810

(22) PCT Filed: May 28, 2013

(86) PCT No.: PCT/JP2013/064733
§ 371 (c)(1),
(2) Date: Nov. 25, 2014

(87) PCT Pub. No.: WO2013/180109
PCT Pub. Date: Dec. 5, 2013

(65) Prior Publication Data
US 2015/0140365 A1    May 21, 2015

(30) Foreign Application Priority Data
Jun. 1, 2012 (JP) ................................ 2012-125759

(51) Int. Cl.
*H01M 16/00* (2006.01)
*H01M 8/04* (2016.01)
(Continued)

(52) U.S. Cl.
CPC ..... *H01M 8/04223* (2013.01); *H01M 8/0488* (2013.01); *H01M 8/04089* (2013.01);
(Continued)

(58) Field of Classification Search
CPC ......... H01M 8/04089; H01M 8/04111; H01M 8/04223; H01M 8/04865; H01M 8/0488;
(Continued)

(56) References Cited

U.S. PATENT DOCUMENTS 5,596,257 A * 1/1997 Miyata .................... F02D 11/10
318/636
2002/0098393 A1  7/2002 Dine et al.
(Continued)

FOREIGN PATENT DOCUMENTS

JP    2006-266218 A    10/2006
JP    2007059090 A     3/2007
(Continued)

OTHER PUBLICATIONS

Machine translation of Japanese Patent Publication No. 2009-117169, publication date May 28, 2009.*

*Primary Examiner* — Sarah A. Slifka
*Assistant Examiner* — Lilia Nedialkova
(74) *Attorney, Agent, or Firm* — Young Basile Hanlon & MacFarlane, P.C.

(57) ABSTRACT

A fuel cell system includes a compressor provided in a cathode gas supply passage configured to feed the cathode gas under pressure to the fuel cell, a bypass passage configured to discharge the cathode gas under pressure by the compressor to a cathode gas discharge passage while bypassing the fuel cell, a bypass valve provided in the bypass passage and configured to adjust a flow rate of the cathode gas flowing in the bypass passage, a system stopping unit configured to stop the fuel cell system by performing a predetermined stop sequence process when a request to stop the fuel cell system is made, and a stop-time bypass valve control unit configured to control a valve body of the bypass valve to a predetermined initialization position in
(Continued)

parallel with the sequence process during the stop sequence process.

6 Claims, 5 Drawing Sheets

(51) Int. Cl.
    *H01M 8/04223*      (2016.01)
    *H01M 8/04089*      (2016.01)
    *H01M 8/04111*      (2016.01)
    *H01M 8/04858*      (2016.01)
    *H01M 8/04955*      (2016.01)

(52) U.S. Cl.
    CPC .... *H01M 8/04111* (2013.01); *H01M 8/04865* (2013.01); *H01M 8/04955* (2013.01); *H01M 16/006* (2013.01); *H01M 2250/20* (2013.01); *Y02T 90/32* (2013.01)

(58) Field of Classification Search
    CPC ........... H01M 8/04955; H01M 16/006; H01M 2250/20; Y02T 90/32
    See application file for complete search history.

(56) References Cited

U.S. PATENT DOCUMENTS

| | | | |
|---|---|---|---|
| 2004/0053089 A1* | 3/2004 | Balliet | H01M 8/04223 429/429 |
| 2008/0087479 A1* | 4/2008 | Kang | 180/65.3 |
| 2010/0266920 A1* | 10/2010 | Kanie | H01M 8/04089 429/431 |

FOREIGN PATENT DOCUMENTS

| | | | |
|---|---|---|---|
| JP | 2008-293869 A | | 12/2008 |
| JP | 2009117169 A | * | 5/2009 |
| JP | 2010-272375 A | | 12/2010 |
| WO | 2009-060679 A1 | | 5/2009 |
| WO | 2009060679 A1 | | 5/2009 |

* cited by examiner

FUEL CELL SYSTEM

CROSS-REFERENCE TO RELATED APPLICATION

The present application claims priority to Japanese Patent Application No. 2012-125759 filed with the Japan Patent Office on Jun. 1, 2012, all the contents of which are hereby incorporated by reference.

TECHNICAL FIELD

The prevent invention relates to a fuel cell system.

BACKGROUND

JP2008-293869A discloses a conventional fuel cell system in which a controller is booted to initialize a valve after the elapse of a predetermined time after the operation of the fuel cell system is finished.

SUMMARY

However, since the controller is booted to initialize the valve after the operation of the fuel cell system is finished in the aforementioned conventional fuel cell system, there is a possibility of producing unnecessary sounds after the system is finished.

On the other hand, if an initialization process is simply added to various stop processes (stop sequence process) to stop the fuel cell system, there is a possibility of making the stop sequence process itself longer.

The present invention was developed in view of such problems and aims to suppress a stop sequence process from becoming longer while controlling a valve to an initialization position during the stop sequence process performed when the operation of a fuel cell system is finished.

According to one aspect of the present invention, a fuel cell system configured to generate power by supplying anode gas and cathode gas to a fuel cell includes a compressor provided in a cathode gas supply passage and configured to feed the cathode gas under pressure to the fuel cell, a bypass passage configured to discharge the cathode gas fed under pressure by the compressor to a cathode gas discharge passage while bypassing the fuel cell, a bypass valve provided in the bypass passage and configured to adjust a flow rate of the cathode gas flowing in the bypass passage, a system stopping unit configured to stop the fuel cell system by performing a predetermined stop sequence process when a request to stop the fuel cell system is made, and a stop-time bypass valve control unit for controlling a valve body of the bypass valve to a predetermined initialization position in parallel with the stop sequence process during the stop sequence process.

An embodiment and advantages of the present invention are described in detail below with reference to the accompanying drawings.

DESCRIPTION OF EMBODIMENTS

In a fuel cell, an electrolyte membrane is sandwiched by an anode electrode (fuel electrode) and a cathode electrode (oxidant electrode) and power is generated by supplying anode gas (fuel gas) containing hydrogen to the anode electrode and cathode gas (oxidant gas) containing oxygen to the cathode electrode. Electrode reactions which proceed in both anode and cathode electrodes are as follows.

$$\text{Anode electrode: } 2H_2 \rightarrow 4H^+ + 4e^- \quad (1)$$

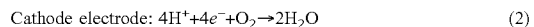

$$\text{Cathode electrode: } 4H^+ + 4e^- + O_2 \rightarrow 2H_2O \quad (2)$$

The fuel cell generates an electromotive force of about 1 volt by these electrode reactions (1) and (2).

In the case of using such a fuel cell as a power source for automotive vehicle, a fuel cell stack in which several hundreds of fuel cells are laminated is used since required power is large. By configuring a fuel cell system for supplying the anode gas and the cathode gas to the fuel cell stack, power for driving a vehicle is taken out.

Figure 1:
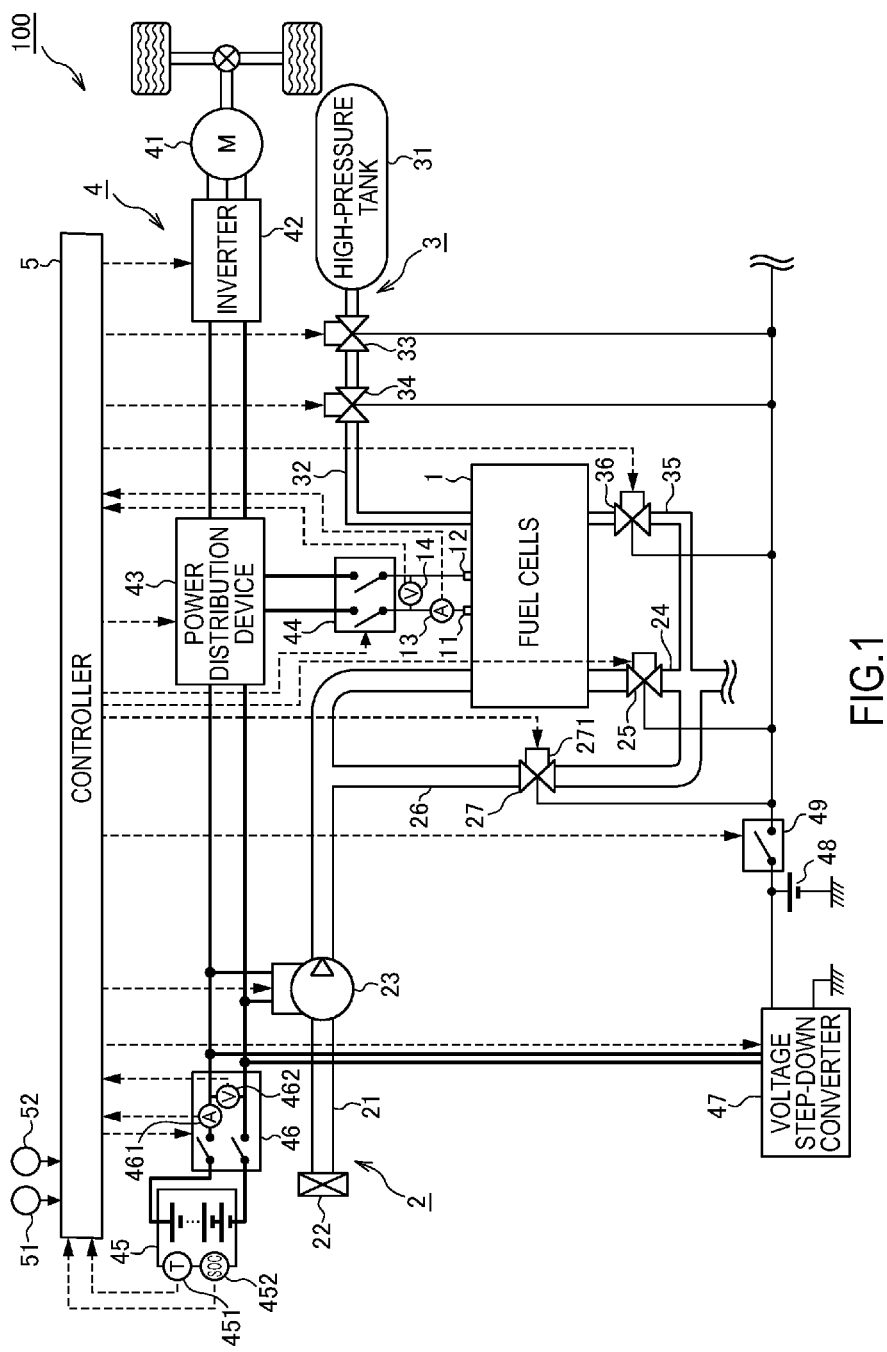
FIG. 1 is a schematic diagram of a fuel cell system according to one embodiment of the present invention.

FIG. 1 is a schematic diagram of a fuel cell system 100 according to one embodiment of the present invention.

The fuel cell system 100 includes a fuel cell stack 1, a cathode gas supplying/discharging device 2, an anode gas supplying/discharging device 3, a power system 4 and a controller 5.

The fuel cell stack 1 is formed by laminating several hundreds of fuel cells and generates power necessary to drive a vehicle upon receiving the supply of the anode gas and the cathode gas. The fuel cell stack 1 includes an anode electrode side output terminal 11 and a cathode electrode side output terminal 12 as terminals for taking out power.

Further, the fuel cell stack 1 includes a current sensor 13 for detecting a current taken out from the fuel cell stack 1 (hereinafter, referred to as a "stack output current") and a voltage sensor 14 for detecting an inter-terminal voltage between the anode electrode side output terminal 11 and the cathode electrode side output terminal 12 (hereinafter, referred to as a "stack output voltage").

The cathode gas supplying/discharging device 2 is a device for supplying the cathode gas to the fuel cell stack 1 and discharging cathode off-gas discharged from the fuel cell stack 1 to outside air. The cathode gas supplying/discharging device 2 includes a cathode gas supply passage 21, a filter 22, a cathode compressor 23, a cathode gas discharge passage 24, a cathode pressure regulating valve 25, a bypass passage 26 and a bypass valve 27.

The cathode gas supply passage 21 is a passage in which the cathode gas to be supplied to the fuel cell stack 1 flows. One end of the cathode gas supply passage 21 is connected to the filter 22 and the other end is connected to a cathode gas inlet hole of the fuel cell stack 1.

The filter 22 removes foreign substances in the cathode gas to be taken into the cathode gas supply passage 21.

The cathode compressor 23 is provided in the cathode gas supply passage 21. The cathode compressor 23 takes air (outside air) as the cathode gas into the cathode gas supply passage 21 via the filter 22 and supplies it to the fuel cell stack 1.

The cathode gas discharge passage 24 is a passage in which the cathode gas discharged from the fuel cell stack 1 flows. One end of the cathode gas discharge passage 24 is connected to a cathode gas outlet hole of the fuel cell stack 1, and the other end serves as an opening end.

The cathode pressure regulating valve 25 is provided in the cathode gas discharge passage. The cathode pressure regulating valve 25 adjusts a pressure of the cathode gas supplied to the fuel cell stack 1 to a desired pressure.

The bypass passage 26 is a passage for discharging a part of the cathode gas discharged from the cathode compressor 23 directly to the cathode gas discharge passage 24 while bypassing the fuel cell stack 1 to avoid hydrogen dilution and the surge of the cathode compressor 23. One end of the cathode gas bypass passage 26 is connected to a part of the cathode gas supply passage 21 downstream of the cathode compressor 23 and the other end is connected to a part of the cathode gas discharge passage 24 downstream of the cathode pressure regulating valve 25.

The bypass valve 27 is provided in the bypass passage 26. The bypass valve 27 is an on-off valve whose opening is adjusted in a stepwise manner by a stepping motor 271 and configured such that the opening thereof is increased when the stepping motor 271 is rotated in a forward direction while being reduced when the stepping motor 271 is rotated in a reverse direction. By adjusting the opening of the bypass valve 27, a flow rate of the cathode gas bypassing the fuel cell stack 1 is adjusted.

The stepping motor 271 is a motor which is rotated by a predetermined basic angle every time a pulse signal is input, and a rotation speed thereof increases with an increase in the frequency of the input pulse signal.

In the present embodiment, a number obtained by dividing a rotation angle of the stepping motor 271 necessary to fully close the bypass valve 27 in a fully open state by the basic angle is called a step number for the sake of convenience and the step number is defined to be zero when the bypass valve 27 is fully closed. The step number when the bypass valve 27 is fully open is called a fully open step number. In the present embodiment, the fully open step number is about 60.

The anode gas supplying/discharging device 3 is a device for supplying the anode gas to the fuel cell stack 1 and discharging anode off-gas discharged from the fuel cell stack 1 to the cathode gas discharge passage 24. The anode gas supplying/discharging device 3 includes a high-pressure tank 31, an anode gas supply passage 32, a cut-off valve 33, an anode pressure regulating valve 34, an anode gas discharge passage 35 and a purge valve 36.

The high-pressure tank 31 stores the anode gas to be supplied to the fuel cell stack 1 in a high-pressure state.

The anode gas supply passage 32 is a passage for supplying the anode gas discharged from the high-pressure tank 31 to the fuel cell stack 1. One end of the anode gas supply passage 32 is connected to the high-pressure tank 31 and the other end is connected to an anode gas inlet hole of the fuel cell stack 1.

The cut-off valve 33 is provided in the anode gas supply passage 32. By closing the cut-off valve 33, the supply of the anode gas to the fuel cell stack 1 is stopped.

The anode pressure regulating valve 34 is provided in a part of the anode gas discharge passage 32 downstream of the cut-off valve 33. The anode pressure regulating valve 34 adjusts a pressure of the anode gas supplied to the fuel cell stack 1 to a desired pressure.

The anode gas discharge passage 35 is a passage in which the anode off-gas discharged from the fuel cell stack 1 flows. One end of the anode gas discharge passage 35 is connected to an anode gas outlet hole of the fuel cell stack 1 and the other end is connected to the cathode gas discharge passage 24.

The purge valve 36 is provided in the anode gas discharge passage 35. The purge valve 36 adjusts a flow rate of the anode off-gas discharged from the anode gas discharge passage 35 to the cathode gas discharge passage 24.

The power system 4 includes a drive motor 41, an inverter 42, a power distribution device 43, a stack power breaker 44, a strong electric battery 45, a strong electric power breaker 46, a voltage step-down converter 47, a weak electric battery 48 and a weak electric power breaker 49.

The drive motor 41 is a three-phase alternating current synchronous motor in which a permanent magnet is embedded in a rotor and a stator coil is wound around a stator. The drive motor 41 has a function as a motor to be driven and rotated upon receiving the supply of power from the fuel cell stack 1 and the strong electric battery 45 and a function as a generator for generating an electromotive force at opposite ends of the stator coil during the deceleration of the vehicle in which the rotor is rotated by an external force.

The inverter 42 is composed of a plurality of semiconductor switches such as IGBTs (Insulated Gate Bipolar Transistors). The semiconductor switches of the inverter 42 are controlled to be opened and closed by the controller 5, whereby direct current power is converted into alternating current power or alternating current power is converted into direct current power. The inverter 42 converts composite direct current power of generated power of the fuel cell stack 1 and output power of the strong electric battery 45 into three-phase alternating current power and supplies it to the drive motor 41 when the drive motor 41 is caused to function as a motor. On the other hand, the inverter 42 converts regenerative power (three-phase alternating current power) of the drive motor 41 into direct current power and supplies it to the strong electric battery 45 when the drive motor 41 is caused to function as a generator.

The power distribution device 43 is a bilateral voltage converter for increasing and decreasing an output voltage of the fuel cell stack 1. In the present embodiment, a DC/DC converter is used as the power distribution device 43. By controlling the stack output voltage by the power distribution device 43, the generated power of the fuel cell stack 1 (stack output current×stack output voltage) is controlled, the charge and discharge of the strong electric battery 45 are controlled, and necessary power is appropriately distributed and supplied to each electric component of a strong electric system such as the cathode compressor 23 and the drive motor 41 and each electric component of a weak electric system such as the cathode pressure regulating valve 25, the bypass valve 27, the cut-off valve 33, the anode pressure regulating valve 34 and the purge valve 36.

The stack power breaker 44 is on-off controlled by the controller 5 to electrically connect or disconnect the fuel cell stack 1 and the power distribution device 43.

The strong electric battery 45 is a secondary battery capable of charging and discharging. The strong electric battery 45 charges an excess of the generated power of the fuel cell stack 1 and the regenerative power of the drive motor 41. The power charged into the strong electric battery 45 is supplied to each electric component of the strong electric system if necessary and supplied to each electric component of the weak electric system via the voltage step-down converter 47. In the present embodiment, a lithium ion battery having an output voltage of about 300 [V] is used as the strong electric battery 45.

The strong electric battery 45 includes a temperature sensor 451 for detecting a temperature of the strong electric battery 45 and an SOC sensor 45 for detecting a state of charge (SOC) of the strong electric battery 45.

The strong electric power breaker 46 is on-off controlled by the controller 5 to electrically connect or disconnect the strong electric battery 45 to or from the power distribution device 43 and the voltage step-down converter 47. Further, the strong electric power breaker 46 includes a current sensor 461 for detecting a current taken out from the strong electric battery 45 (hereinafter, referred to as a "battery output current") and a voltage sensor 462 for detecting an output voltage of the strong electric battery 45 (hereinafter, referred to as a "battery output voltage").

The voltage step-down converter 47 supplies power to each electric component of the weak electric system while reducing an applied voltage. In the present embodiment, a DC-DC converter is used as the voltage step-down converter 47.

The weak electric battery 48 is a secondary battery capable of charging and discharging. The weak electric battery 48 stores power to be supplied to the electric components of the weak electric system during a starting process and a stopping process of the fuel cell system 100 in which power is not generated in the fuel cell stack 1. In the present embodiment, a lead storage battery having an output voltage of about 14 [V] is used as the weak electric battery 48.

The weak electric power breaker 49 is on-off controlled by the controller 5 to electrically connect or disconnect the voltage step-down converter 47 and the weak electric battery 48 to or from each electric component of the weak electric system.

The controller 5 is configured by a microcomputer including a central processing unit (CPU), a read-only memory (ROM), a random access memory (RAM) and an input/output interface (I/O interface).

To the controller 5 are input signals necessary to control the fuel cell system 100 from various sensors such as a rotation speed sensor 51 for detecting a rotation speed of the cathode compressor 23 and a starting switch 62 for detecting a request to start/stop the fuel cell system 100 besides the first current sensor 13, the second current sensor 461, the first voltage sensor 14, the second voltage sensor 462, the temperature sensor 451 and the SOC sensor 452 described above.

The controller 5 stops the fuel cell system 100 by performing a predetermined stop sequence process when the starting switch 52 is turned off, i.e. when a request to stop the fuel cell system 100 is made. On the other hand, the controller 5 starts the fuel cell system by performing a predetermined start sequence process when the starting switch 52 is turned on, i.e. when a request to start the fuel cell system 100 is made.

The stop sequence process is specifically a process for completely stopping the fuel cell system 100 by successively performing a drying process for drying the fuel cell system 1, a stop VLC (Voltage Limit Control) process for reducing the stack output voltage to a predetermined limit voltage, a power generation stopping process for stopping power generation in the fuel cell stack 1, a strong electric stopping process for cutting off the supply of power to the strong electric system and a weak electric stopping process for cutting off the supply of power to the weak electric system after the starting switch 62 is turned off.

The start sequence process is a process for starting power generation in the fuel cell stack 1 by successively performing a weak electric starting process for starting the supply of power to the weak electric system, a strong electric starting process for starting the supply of power to the strong electric system and a stack starting process for performing startup preparation of the fuel cell stack 1 after the starting switch 62 is turned on.

In the present embodiment, a valve body of the bypass valve 27 is controlled to a fully closed position during these stop sequence process and start sequence process. The reason for that is described below.

As described above, the bypass valve 27 is an on-off valve whose opening is adjusted in a stepwise manner by the stepping motor 271.

Since the stepping motor 271 includes no means for directly detecting an actual rotational position, the opening of the bypass valve 27, i.e. a valve body position of the bypass valve 27 is not known immediately after the start of the fuel cell system 100. Thus, an initialization process for grasping the position of the valve body by rotating the stepping motor 271 in the reverse direction to press the valve body of the bypass valve 27 against a valve seat and fully close the opening of the bypass valve 27 is necessary before the start of power generation in the fuel cell stack 1 when the fuel cell system 100 is started.

Once the initialization process is performed, the step number can be calculated according to the number of pulse signals input to the stepping motor 271 until the fuel cell system 100 is stopped next. Thus, the opening of the bypass valve 27 can be grasped.

Here, since the valve body position of the bypass valve 27 is not known before the initialization process is performed, the stepping motor 271 needs to be rotated in the reverse direction at least by the fully open step number to reliably pressing the bypass valve 27 against the valve seat and fully close the valve body 27.

Then, even after the valve body reaches the valve seat during the execution of the initialization process, the stepping motor 271 might be possibly rotated in the reverse direction. If the stepping motor 271 is rotated in the reverse direction even after the valve body reaches the valve seat, the wear of parts increases and sound vibration performance is deteriorated since the valve body is kept pressed against the valve seat. Further, step-out may occur by the valve seat being bounced back by the valve body.

Thus, during the initialization process, the wear of parts, the deterioration of sound vibration performance and the occurrence of step-out as just described need to be suppressed by setting the rotation speed of the stepping motor 271 slower than in normal time. Note that normal time mentioned here means a time during which power is generated in the fuel cell stack 1 and the fuel cell system 100 is operated with that generated power.

The bypass valve 27 controls the flow rate of the cathode gas supplied to the fuel cell system 1 by controlling the flow rate of the cathode gas flowing in the bypass passage 26. Thus, the initialization process of the bypass valve 27 needs to be performed before power generation is started in the fuel cell stack 1. However, it takes time if the stepping motor 271 is rotated in the reverse direction by the fully open step number at the speed slower than in normal time, and a time until power generation is started in the fuel cell stack 1 after the start of the fuel cell system 100 becomes longer. Then, a time until warm-up is completed after the start of the fuel cell system 100 becomes longer as a result of that, wherefore a time until travel is allowed after the start becomes longer to deteriorate merchantability.

Accordingly, in the present embodiment, a stop-time full closing process for controlling the stepping motor 271 to fully close the bypass valve 27 is performed in parallel with the stop sequence process when it is no longer necessary to supply the cathode gas to the fuel cell stack 1 and it becomes unnecessary to control the bypass valve 27 during the execution of the stop sequence process.

When it becomes possible to supply power to the stepping motor 271 of the bypass valve 27 during the execution of the start sequence process when the fuel cell system 100 is started next time, the minimum initialization process for initializing the bypass valve 27 by rotating the stepping motor 271 in the reverse direction by a predetermined initialization step number smaller than the fully open step number is performed in parallel with the start sequence process. In the present embodiment, the initialization step number is set to be about 8.

By fully closing the bypass valve 27 in advance in this way when the fuel cell system 100 is stopped, it is possible to initialize the bypass valve 27 by the initialization step number smaller than the fully open step number when the fuel cell system is started.

Thus, a time necessary to initialize the bypass valve 27 can be shortened and the time until power generation in the fuel cell stack 1 is started after the start of the fuel cell system 100 can be shortened.

Further, to finish the stop-time full closing process during the stop sequence process, the stop-time full closing process is performed in parallel with the stop sequence process when it is no longer necessary to supply the cathode gas to the fuel cell stack 1 and it becomes unnecessary to control the bypass valve 27. Thus, the stop-time fully closing process is not added as one process of the stop sequence process. Therefore, an execution time of the stop sequence process is not extended.

Control contents of the stop-time full closing process performed during the stop sequence process of this fuel cell system 100 and the minimum initialization process performed during the start sequence process of the fuel cell system 100 are described below.

Figure 2:
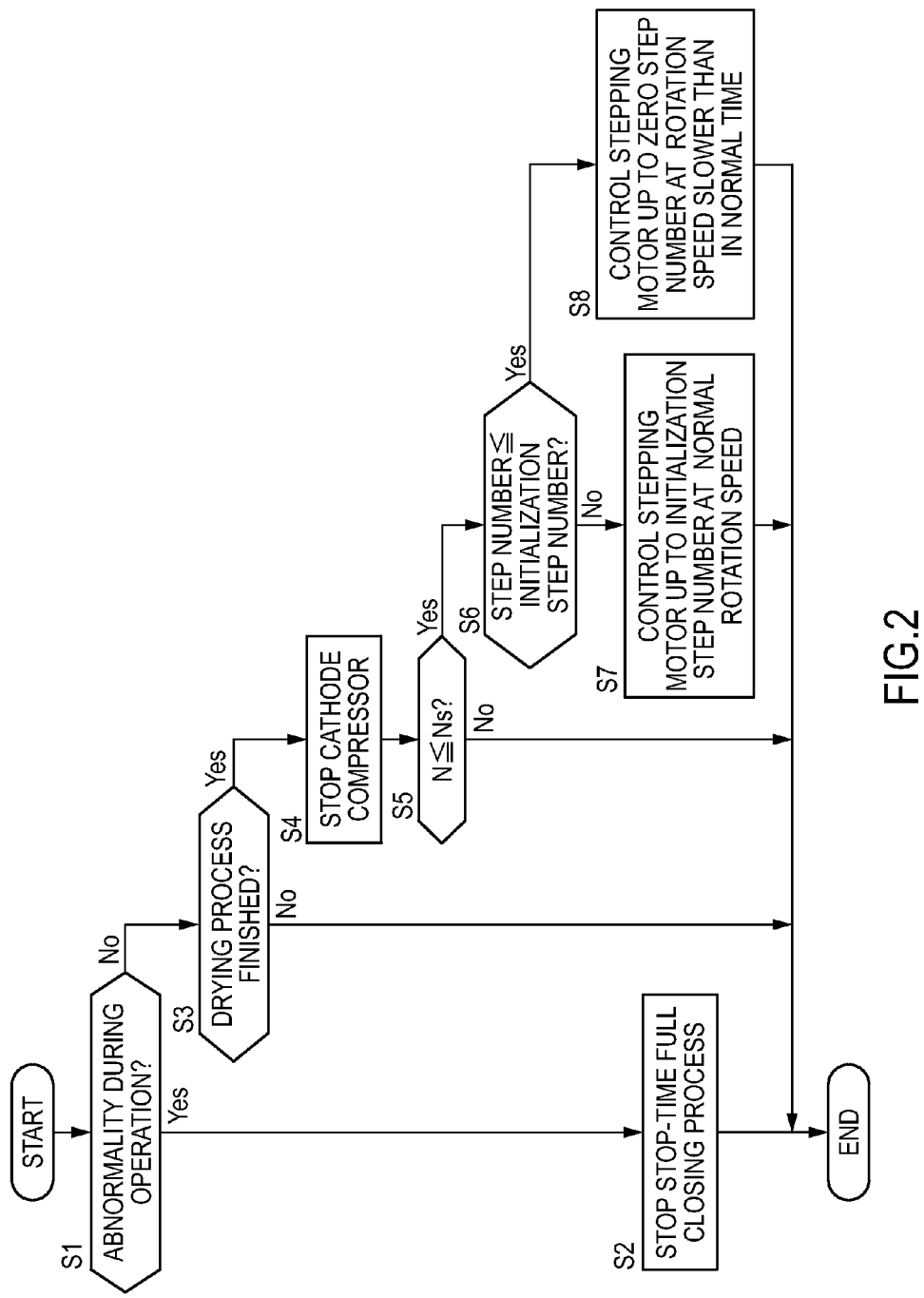
FIG. 2 is a flow chart showing control contents of a stop-time full closing process according to the embodiment of the present invention.

FIG. 2 is a flow chart showing the control contents of the stop-time full closing process according to the present embodiment.

In Step S1, the controller 5 determines whether or not such an abnormality that the stop-time full closing process cannot be performed during the operation of the fuel cell system 100 has occurred. The controller 5 performs a processing of Step S2 if the abnormality has occurred. On the other hand, a processing of Step S3 is performed unless the abnormality has occurred.

In Step S2, the controller 5 stops the execution of the stop-time full closing process during the stop sequence process.

In Step S3, the controller 5 determines whether or not the drying process has been finished. The drying process is a process for discharging moisture in the fuel cell stack 1 to the outside of the system by driving the cathode compressor 23 for a predetermined time with the generated power of the fuel cell stack 1 in preparation for the next start. In this way, the deterioration of startability caused by frozen moisture in the fuel cell stack 1 is prevented. The controller 5 finishes the process this time unless drying has been finished while performing a processing of Step S4 if the drying process has been finished.

In Step S4, the controller 5 stops the cathode compressor 23 by setting a current carrying amount to the cathode compressor 23 at zero.

In Step S5, the controller 5 determines whether or not a rotation speed N of the cathode compressor 23 has dropped to or below a stop determining rotation speed Ns. The controller 5 finishes the process this time if the rotation speed N of the cathode compressor 23 is higher than the stop determining rotation speed Ns. On the other hand, a processing of Step S6 is performed unless the rotation speed N of the cathode compressor 23 is higher than the stop determining rotation speed Ns.

In Step S6, the controller 5 determines whether or not the step number of the stepping motor 271 of the bypass valve 27 is not larger than the initialization step number. The controller 5 performs a processing of Step S7 if the step number of the stepping motor 271 is larger than the initialization step number while performing a processing of Step S8 unless it is larger than the initialization step number.

In Step S7, the controller 5 rotates the stepping motor 271 in the reverse direction at a rotation speed in normal time so that the step number reaches the initialization step number.

In Step S8, the controller 5 rotates the stepping motor 271 in the reverse direction at a rotation speed slower than in normal time so that the step number becomes zero.

Figure 3:
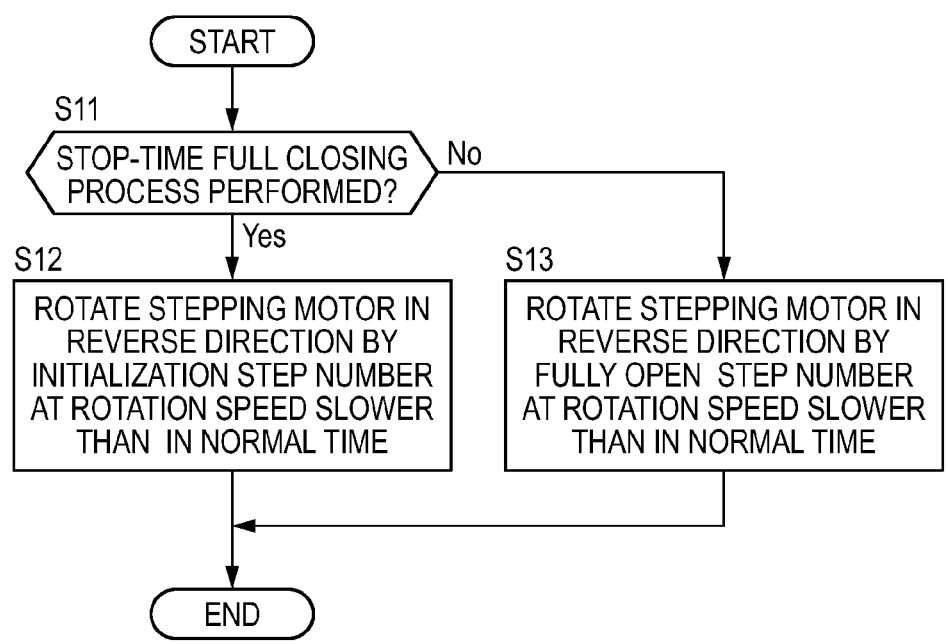
FIG. 3 is a flow chart showing control contents of a minimum initialization process according to the embodiment of the present invention.

FIG. 3 is a flow chart showing the control contents of the minimum initialization process according to the present embodiment.

In Step S11, the controller 5 determines whether or not the stop-time full closing process has been performed during the stop sequence process. The controller 5 performs a processing of Step S12 if the stop-time full closing process has been performed during the stop sequence process. On the other hand, a processing of Step S13 is performed unless the stop-time full closing process has been performed during the stop sequence process.

In Step S12, the controller 5 rotates the stepping motor 271 in the reverse direction at a rotation speed slower than in normal time by the initialization step number. The stepping motor 271 is rotated in the reverse direction by the initialization step number in this way when the stop-time full closing process has been performed during the stop sequence process because the valve body position of the bypass valve 27 can be predicted to be near the fully closed position even when it is deviated from the fully closed position before the next start if the stop-time full closing process has been performed during the stop sequence process, and the valve body can be sufficiently pressed against the valve seat only by rotation in the reverse direction by the initialization step number smaller than the fully open step number.

In Step S13, the controller 5 rotates the stepping motor 271 in the reverse direction at a rotation speed slower than in normal time by the fully open step number. The stepping motor 271 is rotated in the reverse direction by the fully open step number in this way when the stop-time full closing process has not been performed during the stop sequence process because the valve body position of the bypass valve 27 is not known.

Figure 4:
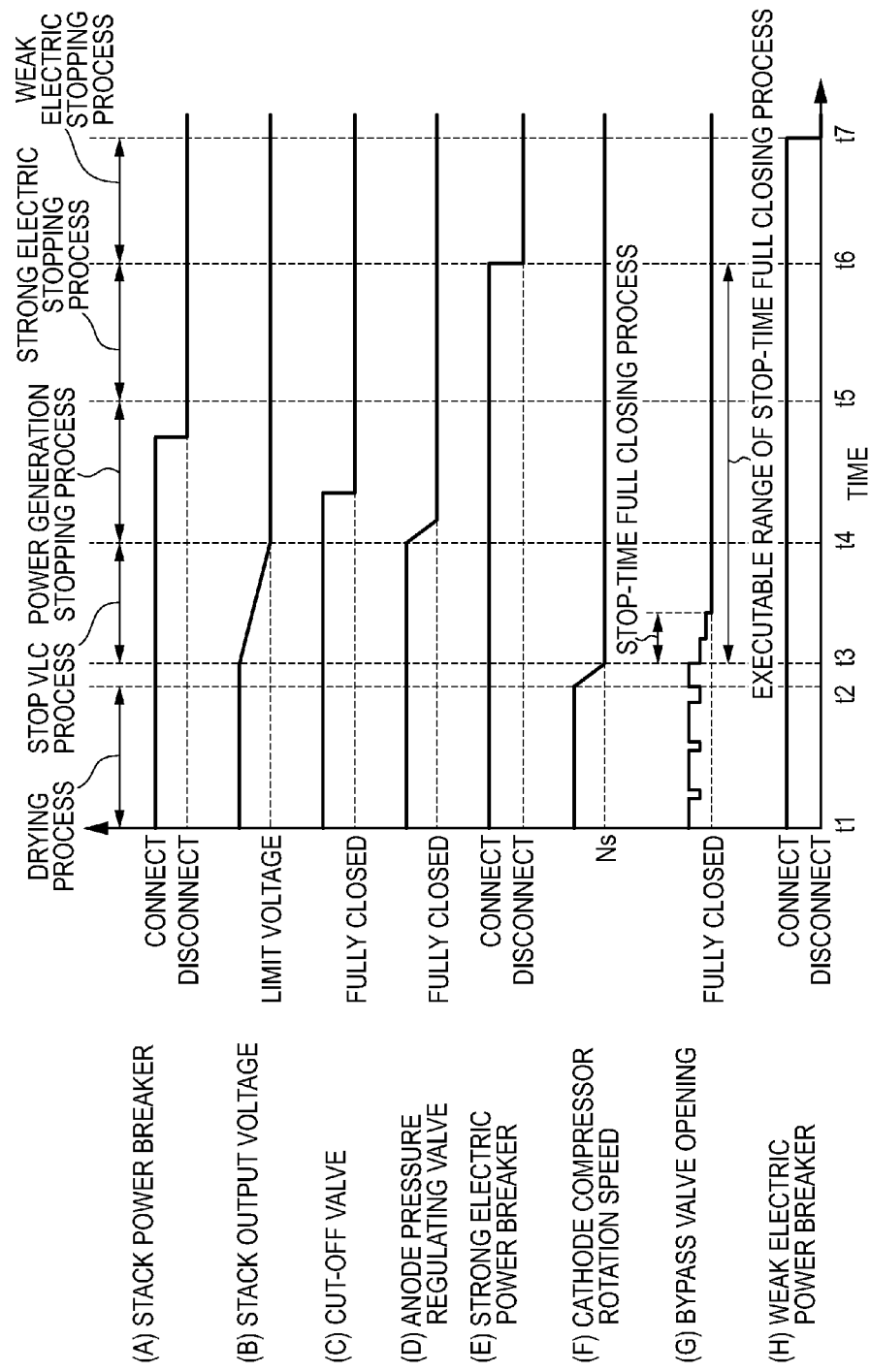
FIG. 4 is a time chart showing the operation of a stopping process of the fuel cell system according to the embodiment of the present invention.

FIG. 4 is a time chart showing the operation of the stop sequence process according to the present embodiment.

When the starting switch 62 is turned off at time t1, the drying process is performed. During the drying process, the anode gas and the cathode gas are supplied to the fuel cell stack 1 and the cathode compressor 23 is driven by the generated power of the fuel cell stack 1.

When the drying process is finished at time t2, energization to the cathode compressor 23 is stopped to perform the stop VLC process.

When the rotation speed of the cathode compressor 23 drops to the stop determining rotation speed Ns at time t3, the stop-time full closing process is performed and the bypass valve 27 is controlled to be fully closed. The stop-time full closing process is performed in this way after the cathode compressor 23 is stopped because the opening of the bypass valve 27 needs to be controlled while the cathode compressor 23 is driven.

Further, at time t3, the stop VLC process is simultaneously performed. The stop VLC process is a process for consuming the cathode gas in the fuel cell stack 1 by supplying only the anode gas and generating power after the supply of the cathode gas is stopped and reducing the stack output voltage to a limit voltage. In this way, it is possible to prevent the deterioration of catalysts of the fuel cells caused by the stop of the fuel cell system 100 with the stack output voltage kept high.

When the stack output voltage drops to the limit voltage at time t4, the power generation stopping process is performed and the cut-off valve 33 is fully closed after the anode pressure regulating valve 34 is fully closed. Finally, the stack power breaker 44 is cut off.

When the power generation stopping process is finished at time t5, the strong electric stopping process is performed to prepare for cutting off the strong electric power breaker 46.

When the strong electric stopping process is finished and the strong electric power breaker 46 is cut off at time t6, the weak electric stopping process is performed to prepare for cutting off the weak electric power breaker 49.

A period from time t3 to time t6 until the weak electric stopping process is started after the drive of the cathode compressor 23 is stopped is a period during which the stop-time full closing process of the bypass valve 27 can be performed.

When the weak electric stopping process is finished at time t7, the weak electric power breaker 49 is cut off. In this way, the fuel cell system 100 is completely stopped.

Figure 5:
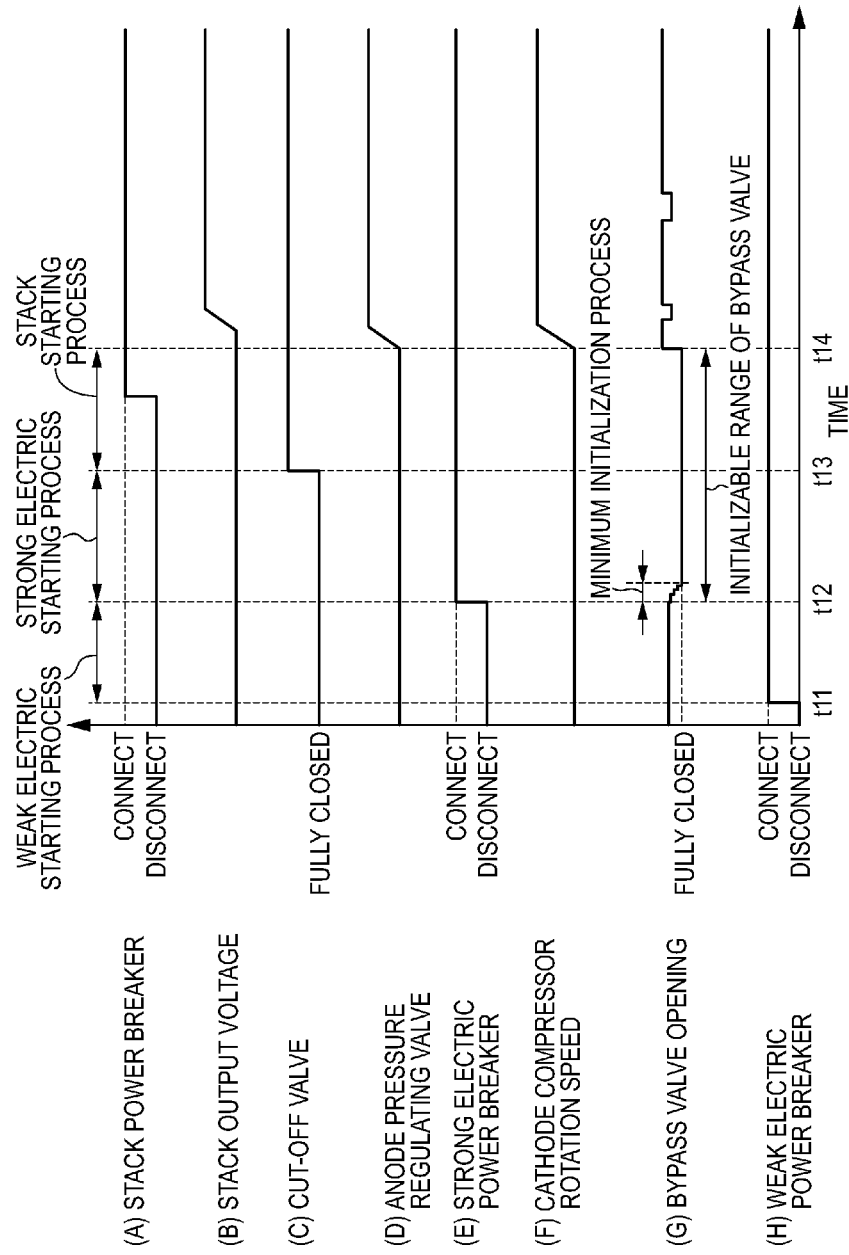
FIG. 5 is a time chart showing the operation of a starting process of the fuel cell system according to the embodiment of the present invention.

FIG. 5 is a time chart showing the operation of the start sequence process according to the present embodiment.

When the starting switch 62 is turned on at time t11, the weak electric power breaker 49 is connected and the weak electric starting process is started. In the weak electric starting process, self-diagnosis of the controller 5, diagnosis on seizure of the weak electric power breaker 49 and the like are made in the weak electric starting process.

When the weak electric starting process is finished at time t12, the strong electric power breaker 46 is connected, the strong electric stopping process is started and the minimum initialization process of the bypass valve 27 is started. The minimum initialization process is started simultaneously with the end of the weak electric starting process in this way because power of the weak electric battery can be supplied to the stepping motor 271 of the bypass valve 27 and the minimum initialization process can be performed when the weak electric starting process is finished.

It should be noted that diagnosis on seizure of the strong electric power breaker 46, judgment as to whether or not the battery output voltage has risen to a predetermined voltage or higher and the like can be made in the strong electric stopping process.

When the strong electric stopping process is finished at time t13, the stack power breaker 44 is connected after the stack starting process is performed and the cut-off valve 33 is opened. Thereafter, the anode pressure regulating valve 34 is opened and the cathode compressor 23 is driven to start power generation of the fuel cell stack 1.

The minimum initialization process of the bypass valve 27 can be performed during a period from time t12 to time t14 until the cathode compressor 23 is driven to supply the cathode gas to the fuel cell stack 1 after the weak electric starting process is finished.

According to the present embodiment described above, the stop-time full closing process is performed in parallel with the stop sequence process so that the stop-time full closing process is finished during the stop sequence process when it is no longer necessary to supply the cathode gas to the fuel cell stack 1 and it becomes unnecessary to control the bypass valve 27.

Since the stop-time full closing process needs not to be added as one process of the stop sequence process as just described, it can be suppressed that the execution time of the stop sequence process becomes longer.

Further, by fully closing the bypass valve 27 in advance when the fuel cell system 100 is stopped, the bypass valve 27 can be initialized by the initialization step number smaller than the fully open step number when the fuel cell system is started. Thus, a time until power generation is started in the fuel cell stack 1 after the start of the fuel cell system 100 can be shortened, wherefore a time until warm-up is completed after the start of the fuel cell system 100 can be shortened. Hence, a time until travel is allowed after the start can be shortened.

Further, since the stop sequence process is performed before the fuel cell system is completely stopped, the opening of the bypass valve can be grasped. Thus, the valve body of the bypass valve needs not be pressed against the valve seat in controlling the bypass valve to the fully closed position unlike in the initialization process. Thus, the wear of parts can be suppressed and the deterioration of sound vibration performance can also be suppressed. Further, step-out caused by bounce back can be suppressed.

Further, according to the present embodiment, the rotation speed of the stepping motor 271 is set slower than in normal time when the step number of the stepping motor 271 of the bypass valve 27 has dropped to the initialization step number or smaller during the stop-time full closing process.

In this way, step-out caused by bounce back when the valve body of the bypass valve 27 reaches the valve seat can be reliably suppressed. Further, the wear of parts and the generation of sound vibration can be further suppressed.

Further, according to the present embodiment, the stop-time full closing process is performed simultaneously with the stop VLC process.

Since the bypass valve 27 is controlled to be fully closed during the stop VLC process in this way, the reverse flow of mixed gas of the cathode off-gas discharged into the cathode gas discharge passage 24 during the step VLC process and the anode off-gas into the bypass passage 26 can be suppressed.

It should be noted that since the stepping motor 271 of the bypass valve 27 is a part of the weak electric system, the stop-time full closing process can be performed until the weak electric stopping process is started after the cathode compressor 23 is stopped. However, by being performed simultaneously with the stop VLC process first performed after the stop of the cathode compressor 23, the stop-time full closing process can be finished at an early stage of the stop sequence process and reliably finished during the stop sequence process.

Although the embodiment of the present invention has been described above, the above embodiment is merely an illustration of one application example of the present invention and not of the nature to limit the technical scope of the present invention to the specific configuration of the above embodiment.

For example, although the initialization position of the bypass valve 27 is the fully closed position in the above embodiment, it may be a fully open position.

Further, although the stop-time full closing process is performed simultaneously with the stop VLC process in the above embodiment, it may be started during the stop VLC process or during the subsequent power generation stopping process or strong electric stopping process as long as the stop-time full closing process is finished before the weak electric stopping process is started.

The invention claimed is:

1. A fuel cell system configured to generate power by supplying anode gas and cathode gas to a fuel cell, comprising:
   a compressor provided in a cathode gas supply passage and configured to feed the cathode gas under pressure to the fuel cell;
   a bypass passage configured to discharge a portion of the cathode gas fed under pressure by the compressor to a cathode gas discharge passage while bypassing the fuel cell;
   a cathode gas discharge passage in which the cathode gas discharged from the fuel cell flows, the cathode gas discharge passage being connected to the bypass passage;
   an anode gas discharge passage in which an anode gas discharged from the fuel cell flows, the anode gas discharge passage being connected to the cathode gas discharge passage;
   a bypass valve provided in the bypass passage and configured to adjust a flow rate of the cathode gas flowing in the bypass passage;
   a system stopping unit configured to stop the fuel cell system by performing a predetermined stop sequence process when a request to stop the fuel cell system is made;
   a stop-time bypass valve control unit configured to perform a stop-time full closing process, the stop-time full closing process being a process of controlling a valve body of the bypass valve to a fully closed initialization position in a voltage limiting process during the stop sequence process for reducing a voltage of the fuel cell after the compressor is stopped; and
   a stepping motor configured to drive the bypass valve;
   a determination unit configured to determine whether or not the stop-time full closing process has been performed by the stop-time bypass valve control unit; and
   a minimum initialization unit configured to rotate the stepping motor after the stop sequence process, wherein:
      the stop-time bypass valve control unit is further configured to:
         start to control the bypass valve during the voltage limiting process; and
         control a rotation speed of the stepping motor so that the rotation speed when a step number of the stepping motor is lower than a predetermined step number becomes slower than the rotation speed when the step number of the stepping motor is higher than the predetermined step number; and
      the minimum initialization unit is further configured to:
         when the determination unit determines that the stop-time full closing process has been performed, rotate the stepping motor by an initialization step number smaller than a fully open step number; and
         when the determination unit determines that the stop-time full closing process has not been performed, rotate the stepping motor by the fully open step number.

2. The fuel cell system according to claim 1, further comprising:
   a strong electric battery; and
   a weak electric battery having a lower electromotive force than the strong electric battery, wherein the stop sequence process includes:
      a power generation stopping process for stopping power generation in the fuel cell after the voltage limiting process is finished, the power generation stopping process including:
         a strong electric stopping process for stopping the supply of power from the strong electric battery after the voltage limiting process is finished, and
         a weak electric stopping process for stopping the supply of power from the weak electric battery after the strong electric stopping process is finished; and
      the stop-time bypass valve control unit starts the control of the bypass valve so as to be able to control the bypass valve to the initialization position before the weak electric stopping process is started.

3. The fuel cell system according to claim 1, wherein:
   the stop-time bypass valve control unit sets a moving speed of the bypass valve slower than a speed of moving a valve body of the bypass valve to a predetermined position when a valve body position of the bypass valve reaches the predetermined position near the initialization position.

4. The fuel cell system according to claim 1, wherein:
   the stop-time bypass valve control unit determines that the compressor has stopped when a rotation speed of the compressor drops to or below a predetermined speed.

5. The fuel cell system according to claim 1, wherein, during control of the bypass valve during the voltage limiting process, the stop-time bypass valve control unit is further configured to:
   determine a step number of the stepping motor of the bypass valve;
   determine an initialization step number; and
   if the step number is larger than the initialization step number, rotate the stepping motor at a normal rotation speed to reach the initialization step number; and
   if the step number is smaller than the initialization step number, rotate the stepping motor at a slower than normal speed until the step number is zero.

6. The fuel cell system according to claim 1, wherein the stop-time bypass valve control unit is further configured to:
   on condition that the step number is larger than the predetermined step number, rotate the stepping motor at a first rotation speed; and on condition that the step number is smaller than the initialization step number, rotate the stepping motor at a second rotation speed that is slower than the first rotation speed.

* * * * *